United States Patent [19]
Lection et al.

[11] Patent Number: 6,091,410
[45] Date of Patent: Jul. 18, 2000

[54] AVATAR POINTING MODE

[75] Inventors: David Bruce Lection, Raleigh, N.C.; Abbott Purdy Brush, II, Woodbridge, Conn.; Mark Edward Molander, Cary, N.C.

[73] Assignee: International Business Machines Corporation, Armonk, N.Y.

[21] Appl. No.: 08/979,669

[22] Filed: Nov. 26, 1997

[51] Int. Cl.⁷ .................................................. G06F 3/00
[52] U.S. Cl. ............................................................ 345/330
[58] Field of Search ................................... 345/427, 474, 345/329, 330

[56] References Cited

U.S. PATENT DOCUMENTS

| | | | |
|---|---|---|---|
| 5,736,982 | 4/1998 | Suzuki et al. | 345/330 |
| 5,880,731 | 3/1999 | Liles et al. | 345/349 |
| 5,884,029 | 3/1999 | Brush, II et al. | 345/358 |
| 5,926,179 | 7/1999 | Matsuda et al. | 345/355 |

*Primary Examiner*—Mark K. Zimmerman
*Assistant Examiner*—Huedung X. Cao
*Attorney, Agent, or Firm*—Jeanine S. Ray-Yarletts; Marcia L. Doubet

[57] ABSTRACT

A method of interacting with one or more objects in a virtual reality (VR) space. A user input establishes a pointing mode, whereupon a visual indicator, such as a pointer, is displayed on the user's viewing device, and the visual indicator is moved on the viewing device to refer to an object in the VR space, in response to actuation of a pointing device such as a mouse, joystick or pen. An image of the user's avatar may also be displayed in the VR space, and the avatar may have an appendage or pointing appliance to point to a target in the 3-D space. A user can point in this manner with high precision, as well as draw illustrations, etc. Other users (viewers) of the same VR space can see the first user's avatar pointing to the target. Another viewer's display can be dynamically adjusted to present an appropriate perspective of the VR space to show the target.

22 Claims, 2 Drawing Sheets

AVATAR POINTING MODE

BACKGROUND OF THE INVENTION

1. Field of the Invention

The present invention generally relates to computer systems, and particularly to a method of controlling and displaying visual perspectives in a virtual reality space using pointing techniques, and still more particularly to such a method implemented in a multi-user virtual reality space.

2. Description of the Related Art

Computers can be used to provide a wide variety of visual presentations and graphic illustrations on display monitors and other viewing devices. Examples include such diverse applications as video games, educational tools, and artistic drawing interfaces. Early computer graphics technology was two-dimensional (2-D), that is, limited to the visual appearance of generally flat objects. As this technology developed, and with the advent of more powerful computers, programs have been devised to allow the presentation of three-dimensional (3-D) objects and environments.

A computer defines a 3-D object using a mathematical model or representation, such as a solid of revolution, or a group of polygons which have been connected along various sides to provide an exterior shape for the object. One initial use of 3-D imagery was in computer-aided design (CAD), a type of computer program which can display an object such as a manufacturing component or chemical structure from various viewing angles, even animating the object through the quick, successive display of multiple viewpoints. The depth component of an object can be further accentuated using shading and perspective techniques based on a given viewing location and assumed source of light. More complicated 3-D objects can be designed by combining basic 3-D objects or by using volumes or surfaces defined by overlapping objects, and 3-D environments of varying size can be constructed by spreading out or interconnecting several 3-D objects in a defined space.

The term "virtual reality" (VR) refers to such a simulated 3-D environment that a computer user can explore by changing the user's viewing angle or location, and that a user can further sometimes modify or interact with by manipulating objects in the VR space (e.g., moving, duplicating or deleting objects). Different viewing devices can be used to present a VR world, such as a simple display screen, or a screen mounted in a helmet or special pair of goggles, or even stereoscopic screens. Input devices can be similarly simple or complex, ranging from a joystick-type controller or a pointing device (e.g., a so-called mouse), to special accoutrements (e.g., a glove) fitted with sensors which detect the user's movements. The VR space can be constructed or customized by the user, or pre-defined by another computer user or administrator, or the program itself.

When a user "enters" a virtual world, there is not necessarily any object in the VR space that directly corresponds to the user, but it is nevertheless common to associate the user with a character object in the virtual world. The user's character object is referred to herein as an avatar. The avatar can be of various forms, but is typically humanoid/bipedal, and the viewing location that determines the displayed image corresponds to the general vicinity of the eyes of the virtual character, with the viewing angle determined by the orientation (inclination) of the avatar's head. In other words, the user "sees" the virtual world through the eyes of the avatar. Some computer systems provide simultaneous access to a single virtual world for many users. In this case, each user can have a different avatar, with each user's display providing a different perspective (those perspectives can, for example, include the images of other users' avatars). Applications for virtual reality include, again, video games, educational tools, and artistic drawing interfaces as well as business applications such as virtual business meetings, trade shows, electronic malls, etc. In multi-user applications, avatars might have different limitations on their virtual abilities, e.g., to actively participate and interact, or to just passively view other avatars.

Current computer technology does not provide any easy means for the user to precisely control the movement of an avatar or its body parts. Currently, a user must wear a cumbersome and expensive body suit or body glove to control an avatar's body movements. For this reason, most avatars are controlled using gestures. Gestures are visible viewable actions which the user can instruct the avatar to execute through the input device(s). For example, a user can instruct an avatar to smile, handshake, walk, punch, etc. Gestures are very limited in controlling the avatar. With conventional technology, it is impossible to allow a user to gain precise control of an avatar in order to perform, e.g., high precision pointing, diagramming, drawing, or other actions which require delicate movement of the avatar's appendage(s).

In light of the foregoing, it would be desirable to devise a method to allow precision control of the avatar's interactions with virtual objects and the virtual 3-D environment. It would be further advantageous if the method were applicable to a multi-user environment, and responded to such precision control by appropriately adapting the perspectives of other users.

SUMMARY OF THE INVENTION

It is therefore one object of the present invention to provide a method of interacting with a virtual reality (VR) space.

It is another object of the present invention to provide such a method which allows a user to precisely target features or objects located in the VR space using an avatar.

It is yet another object of the present invention to provide such a method that automatically adjusts other users (viewers) displayed perspectives in response to the avatar's actions.

The foregoing objects are achieved in a method of interacting with one or more objects in a VR space generally comprising the steps of receiving a user input to establish a pointing mode, displaying a visual indicator on a viewing device, and moving the visual indicator on the viewing device to refer to an object in the VR space, in response to actuation of a pointing device. An image of an avatar may also be displayed in the VR space (on the viewing device), and the avatar may use an appendage or pointing appliance to point to a target in the 3-D space by using the pointing device in 2-D to extrapolate 3-D coordinates which are transferred to the appendage or pointing appliance. A user can point in this manner with high precision, as well as draw illustrations. Other users (viewers) of the same VR space can see the first user's avatar pointing to the target. Another viewer's display can be dynamically adjusted to present an appropriate perspective of the VR space to show the target.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

The present invention is directed to a method of interacting with a virtual (computer-generated), three-dimensional (3-D) environment, which allows a computer user to precisely control the movement of the user's avatar (virtual character) in the virtual reality space. The method places an avatar into a pointing mode, which can be switched (toggled) on or off, and can alternatively or additionally create a pointing instrument for the avatar, as discussed further below. When the avatar is in the pointing mode, the user assumes direct control of a virtual pointing object, e.g., an appendage of the avatar such as an arm.

When the avatar enters the pointing mode, the avatar's pointing arm tracks the computer user's pointing device, such as a mouse, pen, etc. The user's viewing device presents a visual interface or browser which provides a window into the virtual reality (VR) space. In the user's display, a graphic element such as a pointer (e.g., an arrowhead or cross-hairs) may appear to represent activation of the pointing mode. The user physically actuates the pointing device to cause the graphical pointer to move on the viewing device, and thereby point to objects in the VR space, or further carry out high precision diagramming or drawing. The 2-D pointing mode can be implemented with conventional graphical user interfaces (GUIs). The user preferably sees this pointing operation based on the avatar's view of where the avatar is pointing, i.e., within its current field of vision or applied perspective.

Figure 1:
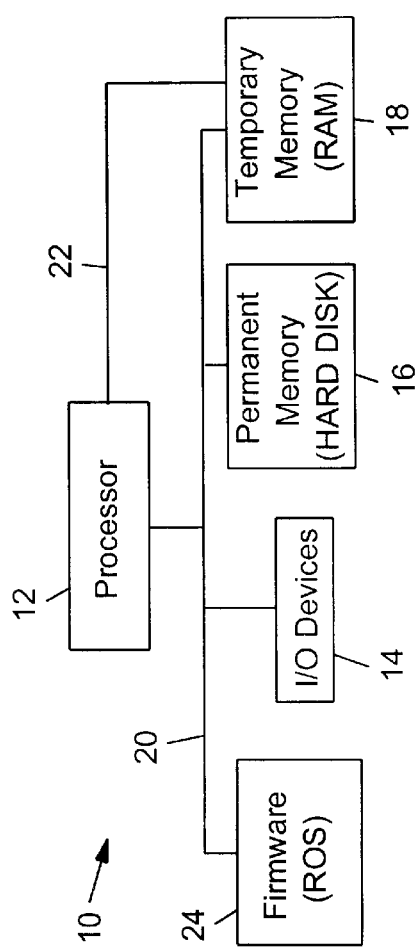
FIG. 1 is a block diagram of a computer system adapted in accordance with the present invention to provide a virtual reality (VR) interface having a high-precision pointing mode.

With reference now to the figures, and in particular with reference to FIG. 1, there is depicted one embodiment of a computer system 10 which has been adapted to carry out the method of the present invention. Computer system 10 includes a central processing unit (CPU) or processor 12 which is connected to several peripheral devices, including input/output (I/O) devices 14 (such as a display monitor, keyboard and pointing device) for the user interface, a permanent memory device 16 (such as a hard disk or floppy diskette) for storing the computer's operating system and user programs, and a temporary memory device 18 (such as random access memory or RAM) that is used by processor 12 to carry out program instructions. In particular, a virtual reality computer program may be stored on permanent memory device 16 with appropriate instructions to enable processor 12 to receive user input(s) to establish a pointing mode for an avatar, and receive further input(s) from a pointing device to allow the user to control a visual indicator on the display monitor that is used in the VR space, to manipulate or refer to an object in the VR space.

Processor 12 may communicate with the peripheral devices by various means, including a generalized interconnect (bus) 20, or a direct channel 22. Computer system 10 may also have many additional components which are not shown, such as serial and parallel ports for connection to, e.g., modems or printers. Those skilled in the art will further appreciate that system 10 is depicted at a high level, and there are other components that might be used in conjunction with those shown in the block diagram of FIG. 1; for example, a display adapter connected to processor 12 might be used to control a video display monitor. Various types of device drivers (software programs loaded in temporary memory 18) may be used to control the hardware devices. Computer system 10 preferably includes firmware 24 whose primary purpose is to seek out and load an operating system from one of the peripherals (e.g., permanent memory device 16) whenever the computer is first turned on. The computer can have more than one processing unit, or be part of a distributed processing environment.

The present invention is particularly applicable to a multi-user computer system which allows multiple users to interact in the same VR space using respective avatars. Such a system can be embodied in, e.g., a star network having a centralized processing node with multiple user terminals connected to the node, or in a distributed processing environment such as a client-server network. In a multi-user implementation, any one of the users might be able to enter into a pointing mode (although this feature might be limited to a single user, for example, to a teacher in a virtual classroom). The computer system may provide the other users (viewers) in the virtual world with a representation of the first user's avatar performing the pointing, drawing, etc. In other words, the viewers do not necessarily see any graphical pointer or other visual indicator on their display which is responsive to (controlled by) the first user's pointing device, but rather simply see the avatar as if it were a real person pointing, e.g., with its arm or a hand having a pointed index finger.

The present invention may optionally provide a virtual pointing appliance in the 3-D space. The avatar could be holding the pointing appliance which, for example, could be a pen (used for drawing), or a pointing rod or baton (used for instruction). More specialized virtual pointing appliances could be provided, like a light (laser) pointer which could be used for pointing to objects which are somewhat distant from the avatar in the VR space. Also, multiple users can be allowed to enter the pointing mode and use other appliances, such as in a collaborative 3-D "whiteboard" room (a virtual room having one or more virtual walls on which the avatars can draw ideas and point to during a discussion).

Figure 2:
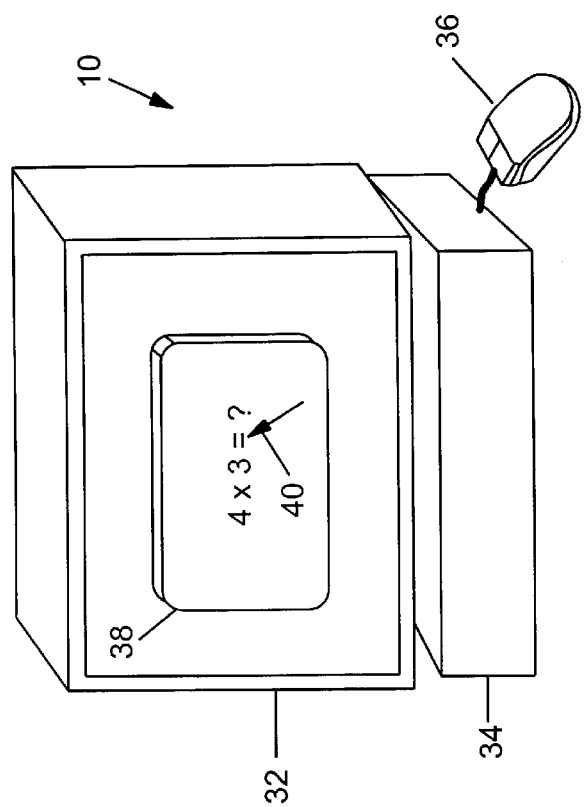
FIG. 2 is a perspective view of a computer whose user is interacting with a VR space using a pointing mode according to the present invention.

Referring now to FIG. 2, a computer 10' is depicted having a video display monitor 32, a CPU unit 34, and a pointing device in the form of a mouse 36. The user of computer 10' is interacting with a VR space using mouse 36. The VR space includes a virtual chalkboard object 38 which receives textual or graphic information. The user, upon entering the pointing mode, can manipulate mouse 36 to cause a visual pointer (arrowhead) 40 to point to various objects in the VR space, such as virtual chalkboard 38.

Figure 3:
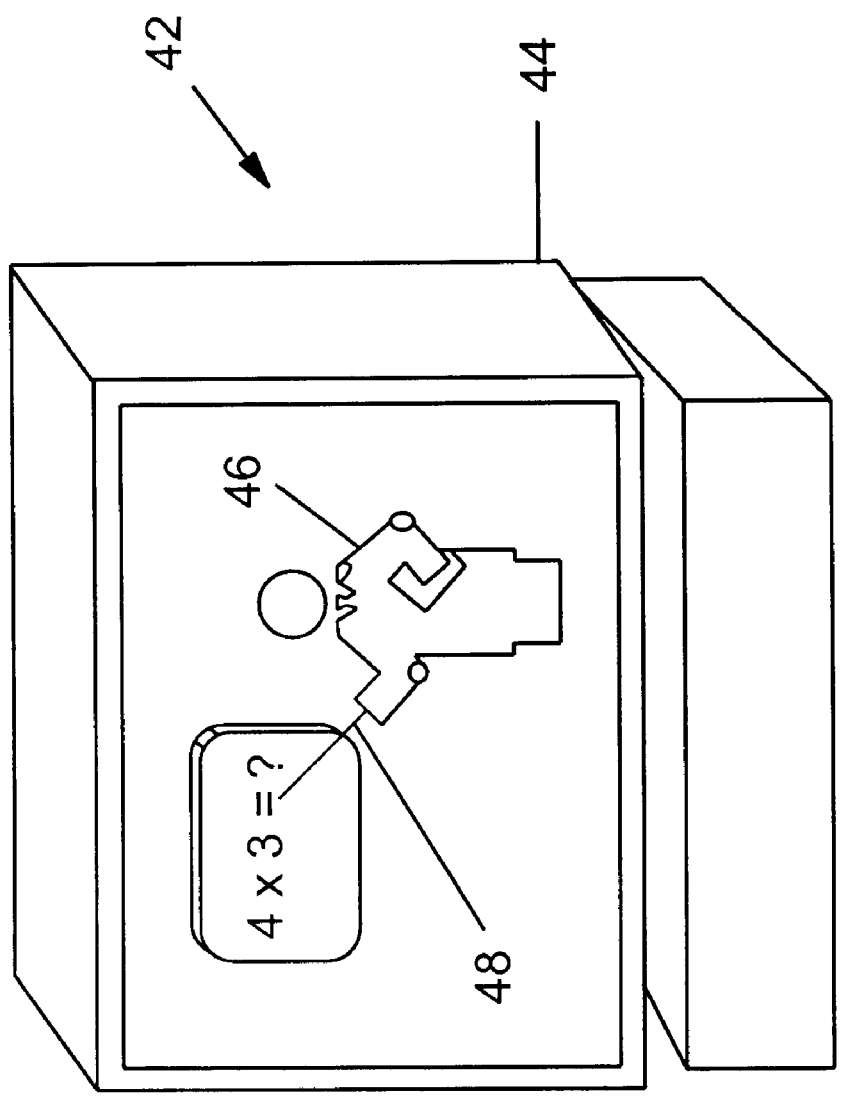
FIG. 3 is a perspective view of another computer whose user is viewing the VR space shown in FIG. 2.

With further reference to FIG. 3, another user at a different computer 42 can see on the associated video display monitor 44 the same VR space generated for computer 10', including virtual chalkboard 38. Computer 42 may be linked to computer 10' by any convenient means, such as a local area network (LAN). Computer 42 also displays an avatar 46 which represents the user at computer 10'. Avatar 46 has a rod 48 which is used to point at various objects in the VR space. As the user at computer 10' moves mouse 36 to control arrowhead 40 on display 32, rod 48 moves accordingly to point toward the same location (in the VR space) on display 44 that corresponds to the location indicated by arrowhead 40 on display 32.

If a user moves the visual indicator on the screen to a different position, the pointing object in the VR space can adjust to reach the new area or object being referenced, if possible, such as by the avatar's arm bending and stretching (using inverse kinematics) to point to the new area or object. If the maximum length of the avatar's arm would not reach the new area or object from the avatar's current location in VR space, the avatar can automatically and naturally be moved (using its native locomotive capabilities to reposition itself), e.g., from the right-hand side of the chalkboard in FIG. 3 to the left-hand side of the chalkboard, so that the avatar's arm can reach the new area or object from the new location. The avatar is preferably re-positioned so as to minimize the number of viewers whose view of the subject portion of the VR space would be occluded by the avatar's new location.

Another aspect of the present invention is the provision of viewer tracking of the pointer for automatic adjustment of the viewer's focus. When a user is in the pointing mode, other viewers' viewpoints can optionally be trained on the pointing surface. In other words, the field of vision of the viewer(s) can be adjusted dynamically according to where the avatar is pointing, and thereby allow the viewer(s) to follow the target of the user's pointing regardless of where the target is in the virtual world. In this manner, if a viewer's display did not previously show the target, its viewpoint will change to include the target automatically, even moving the viewer's avatar in the VR space if desirable. This feature could be further refined by providing different zoom settings for pointer tracking and adjustment, for example, a first zoom setting wherein the field of view is selected to include both the avatar's image and the pointing target (a wide-angle view), and a second zoom setting wherein the field of view is selected to be substantially filled with the immediate space around the target (a close-in view). If multiple viewers close in on a target, the program may automatically make their corresponding avatars transparent or translucent so as not to obstruct one another's view of the target.

The present invention is not limited to use with humanoid/bipedal avatar models. It may be applied to any kind of avatar (natural or fictional creatures), and with any kind of pointing appendages and/or appliances.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of enabling precise interaction with one or more objects in a virtual reality (VR) space generated by a computer system comprising the steps of:

receiving a user input from a first user to establish a pointing mode of an avatar representing the first user in the VR space;

displaying a visual indicator on the first user's viewing device while the pointing mode is established, a location of the visual indicator being responsive to a pointing device of the first user;

moving the pointing device, by the first user, to cause the location of the visual indicator on the first user's viewing device to refer to an object in the VR space; and providing an image of a virtual pointing object in the VR space on at least one other viewing device, wherein the virtual pointing object points from the avatar representing the first user to the location referred to by the visual indicator.

2. The method of claim 1 further comprising the steps of:

manipulating by the first user, the object referred to by the visual indicator; and updating the image of the virtual pointing object in the VR space on the at least one other viewing device to reflect the manipulation.

3. The method of claim 1 wherein the object referred to by the visual indicator is a virtual drawing surface, and further comprising the steps of:

drawing, by the first user, an illustration on the virtual drawing surface by using the pointing device of the first user to move the visual indicator across a portion of the virtual drawing surface; updating the VR space on the at least one other viewing device to reflect the illustration; and updating the image of the virtual pointing object in the VR space on the at least one other viewing device to reflect the drawing.

4. The method of claim 1 wherein said virtual pointing object is a virtual pointing appliance.

5. The method of claim 1 wherein said virtual pointing object is an appendage of the avatar representing the first user.

6. The method of claim 1 wherein the virtual pointing object is a virtual pointing appliance displayed as an appendage of the avatar representing the first user.

7. The method of claim 1 further comprising the step of dynamically adjusting the VR space displayed on the at least one other viewing device in response to the movement of the pointing device.

8. A computer system comprising:

a plurality of display devices;

at least one pointing device usable by a first user of said system;

at least one processor for carrying out program instructions, connected to a first one of said display devices and said pointing device; and a memory for storing program instructions, said program instructions comprising:

means for generating a virtual reality (VR) space;

means for receiving a user input from the first user to establish a pointing mode of an avatar representing the first user in the VR space;

means for displaying a visual indicator on said first display device, a location of the visual indicator being responsive to the pointing device usable by the first user;

means for moving the pointing device, by the first user, to cause the location of said visual indicator on said first display device to refer to an object in said VR space; and means for providing an image of a virtual pointing object in the VR space on at least one other of the plurality of display devices, wherein the virtual pointing object points from the avatar representing the first user to the location referred to by the visual indicator.

9. The computer system of claim 8 wherein:

said object is a virtual drawing surface; and said program instructions further comprise:

means for drawing, by the first user, an illustration on said virtual drawing surface by using said pointing device to move said visual indicator across a portion of said drawing surface; means for updating the VR space on the at least one other display device to reflect the illustration; and means for updating the image of the virtual pointing object in the VR space on the at least one other display device to reflect the drawing.

10. The computer system of claim 8 wherein said virtual pointing object is a virtual pointing appliance.

11. The computer system of claim 8 wherein said program instructions further comprise means for dynamically adjusting said VR space displayed on said at least one other display device in response to operation of the means for moving said pointing device.

12. The method of claim 1 wherein the visual indicator is an arrow and the virtual pointing object is a graphical representation of one of a pointing rod, a baton, or a laser pointer.

13. The method of claim 1 wherein the visual indicator is an arrow and the virtual pointing object is a graphical representation of a pen.

14. The method of claim 1, further comprising the steps of changing the location of the visual indicator by the first user, using the pointing device; and updating the image of the virtual pointing object in the VR space on the at least one other viewing device to reflect the changed location.

15. The method of claim 14, further comprising the step of automatically moving the avatar representing the first user when the changed location cannot be reached by extending the virtual pointing object from the avatar.

16. The method of claim 15, further comprising the step of automatically moving the avatar representing the first user so as to occlude a view of the location referred to by the visual indicator for a minimal number of viewers.

17. The method of claim 1, further comprising the step of automatically adjusting a view on the at least one other viewing device such that the view is oriented toward the location referred to by the visual indicator.

18. The method of claim 19, further comprising the step of making at least one avatar representing a different user translucent or transparent so as not to obstruct the adjusted view.

19. A computer program product comprising:

a storage medium adapted to be read by a computer; and program instructions stored on said storage medium, said program instructions comprising:

computer-readable program code means for generating a virtual reality (VR) space;

computer-readable program code means for receiving a user input from a first user to establish a pointing mode of an avatar representing the first user in the VR space;

computer-readable program code means for displaying a visual indicator on a display device of the first user, a location of the visual indicator being responsive to a pointing device usable by the first user;

computer-readable program code means for moving the pointing device, by the first user, to cause the location of the visual indicator on the display device of the first user to refer to an object in the VR space; and computer-readable program code means for providing an image of a virtual pointing object in the VR space on at least one other display device, wherein the virtual pointing object points from the avatar representing the first user to the location referred to by the visual indicator.

20. The computer program product of claim 19 wherein:

the object is a virtual drawing surface; and said program instructions further comprise:

computer-readable program code means for drawing, by the first user, an illustration on the virtual drawing surface by using the pointing device to move the visual indicator across a portion of the drawing surface;

computer-readable program code means for updating the VR space on the at least one other display device to reflect the illustration; and computer-readable program code means for updating the image of the virtual pointing object in the VR space on the at least one other display device to reflect the drawing.

21. The computer program product of claim 19 wherein said virtual pointing object is a virtual pointing appliance.

22. The computer program product of claim 19 wherein said program instructions further comprise computer-readable program code means for dynamically adjusting the VR space displayed on the at least one other display device in response to operation of the computer-readable program code means for moving the pointing device.

* * * * *